July 23, 1929.  J. B. TWEET  1,721,649
HEN'S NEST
Filed April 9, 1927
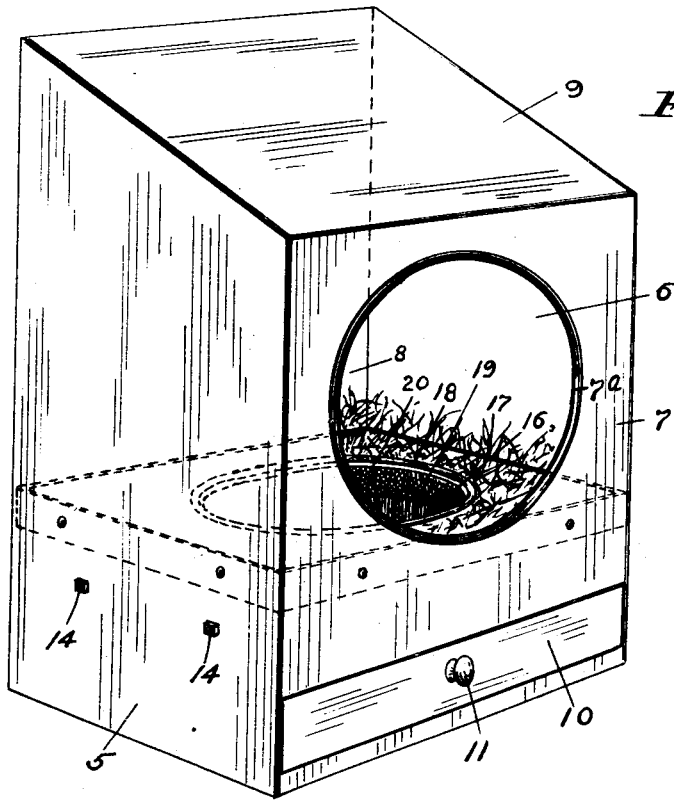
Fig.1.
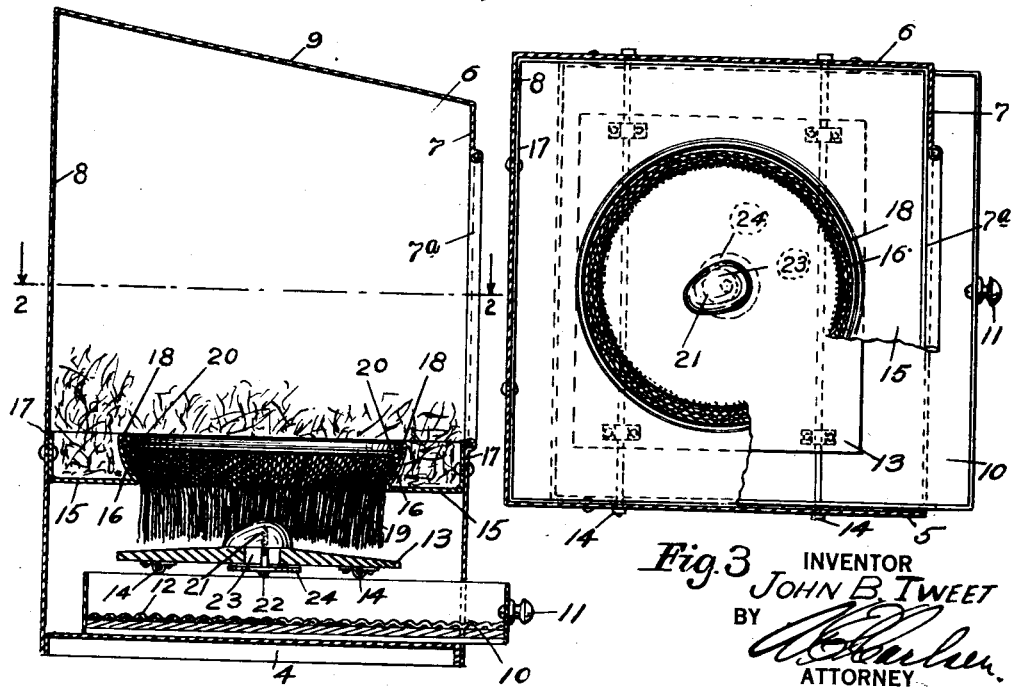
Fig.2.
Fig.3.
INVENTOR
JOHN B. TWEET
BY
ATTORNEY Patented July 23, 1929.

1,721,649

UNITED STATES PATENT OFFICE.

JOHN B. TWEET, OF FRANKLIN, MINNESOTA, ASSIGNOR OF ONE-FOURTH TO SEVAT HATLESTAD, OF MINNEAPOLIS, MINNESOTA, AND ONE-FOURTH TO EDWARD J. MIELKE, OF HAMBURG, MINNESOTA.

HEN'S NEST.

Application filed April 9, 1927. Serial No. 182,223.

This invention relates to poultry coop equipment and the primary object is to provide an efficient, practical and comparatively simple form of hen's nest which incorporates a receptacle for eggs, and which is so constructed that eggs will drop from the nest proper into the receptacle, and yet will cause no discomfort to the hen. Further and more specific objects will be disclosed in the course of the following specification, reference being had to the accompanying drawing, in which:

Fig. 1 is a perspective view of a single unit hen's nest embodying my invention.

Fig. 2 is a sectional elevation of the unit, taken on a plane extending centrally therethrough, from front to back.

Fig. 3 is a sectional plan view, about as on the line 3—3 in Fig. 2, and with a fractional portion broken away for purpose of illustration.

Referring to the drawing more particularly and by reference characters 4 designates the base or bottom of a nest unit or case, having side walls 5 and 6, a front wall 7, having a central opening 7ª, a rear wall 8, and a roof or cover 9, the latter being preferably sloped as shown. In the lower portion of the case 4—9, I provide a drawer 10, having a knob 11, and which is preferably provided with a layer of corrugated paper 12, or a suitable equivalent, upon which the eggs may drop without breaking.

Immediately above the drawer 10 is a rectangular plate or platform 13, carried upon a pair of rods 14 the ends of which are secured in the side walls 5 and 6. This plate 13 serves as a bottom for the nest proper, and primarily supports the hen. It will be noted that the upper face of the plate slopes outwardly from the center, thus causing the eggs laid upon it to roll off the plate, and that the plate is spaced from all the walls of the case sufficiently far to permit the eggs to drop down from the plate and into the drawer. It will thus also be seen that the drawer is substantially as large, i. e., long and wide, as the case, so that when the drawer is fully closed an egg dropping over any edge of the plate will be received in the drawer.

To assist in properly and comfortably supporting the hen, and to give a more natural and and attractive appearance to the nest, I provide a support 15, having a circular opening formed by a ring shaped portion 16. The support 15 is provided with suitable means, such as flanges 17, by which it may be secured in place. The ring portion 16 is dished inwardly, as in a natural nest, and is provided at its upper end with a bead 18. I then take a circular strip of burlap, such as 19, or of any other suitable material, and line the ring 16. This material may be held in place by suitable means such as clips or a spring ring 20, which engages the material directly under the bead 18. The material 19 drops below the ring 16, substantially down to the plate 13, in a frayed or tattered fringe, which thus gives a bowl shaped effect to the nest, yet will not prevent the egg from rolling out under the support 15 and down into the drawer.

To further attract the hen, I provide a semi-egg-shaped block 21, in simulation of a real egg, and which effects an appearance that the nest is more bowl shaped than it actually is. This block cannot be rolled or pushed off by the hen, due to the fact that it is secured by a screw 22 which passes through a hole 23 in the plate 13, and carries a plate 24 under the plate 13. The plate 24 is considerably larger than the hole 23, which is larger than the screw or pin 22, and as the plate 24 is quite free with respect to the plate 13, it will be seen that the hen may move the block 21 around and rotate it in so far as the member 22 has freedom for movement in the hole 23. Thus, while the hen cannot remove the block, she can shift it around to suit her own comfort in much the same manner that a real or china egg may be shifted in another nest. It may here be noted that the elements 15—16—17 form a channel like chamber around the nest ring 16. This chamber may contain hay or straw, to further effect a natural surrounding for the hen, or may even be used to contain feed if so desired.

It will be understood that the drawer 10 may be emptied as often as found necessary or desirable, and that it may be opened and closed without disturbing a hen that may be setting in the nest.

It is further understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A device of the character described, comprising a casing, a drawer slidably carried therein, a floor forming plate member arranged above the drawer and having edges spaced from the casing whereby eggs may pass from the top of the plate and into the drawer, and a curved nest forming band arranged above the plate, said band being spaced from the walls of the casing whereby to form a nest surrounding chamber.

2. In a hen's nest having a member forming the bottom of the nest, an egg simulating device secured to said member but having a limited freedom of sliding movement thereon whereby it may be shifted around but not removed from the member by a hen, said device having the general form of a half egg and having its curved face upward.

3. In a hen's nest having a member forming the bottom of the nest, said member having a hole therein, an egg simulating device arranged over the hole and secured by a means having a freeedom for movement in said hole whereby the device may be shifted about on the bottom but not removed by a hen in the nest.

4. A hen's nest comprising a plate and a ring arranged thereabove so as to form a substantially bowl shaped nest, an egg simulating device slidably secured to said plate by means extending downwardly into the plate permitting a limited freedom of shifting movement of the device on the plate by a hen.

5. A hen's nest comprising a plate and a ring arranged thereabove so as to form a substantially bowl shaped nest, an egg simulating device slidably secured to said plate by means extending downwardly into the plate permitting a limited freedom of shifting movement of the device on the plate by a hen, said means also permitting a rotation of the device in a horizontal plane.

6. A hen's nest comprising a plate and a ring arranged thereabove so as to form a substantially bowl shaped nest, an egg simulating device secured to said plate by means permitting a limited freedom of shifting movement of the device on the plate by a hen, said device having the general form of one-half an egg the flat face of which is in engagement with the plate.

In testimony whereof I affix my signature.

JOHN B. TWEET.